US012527631B2

(12) United States Patent
Black et al.

(10) Patent No.: US 12,527,631 B2
(45) Date of Patent: Jan. 20, 2026

(54) REAL TIME FUSED HOLOGRAPHIC VISUALIZATION AND GUIDANCE FOR DEPLOYMENT OF STRUCTURAL HEART REPAIR OR REPLACEMENT PRODUCT

(71) Applicant: MEDIVIEW XR, INC., Cleveland, OH (US)

(72) Inventors: John Black, Bowling Green, OH (US); Mina S. Fahim, New Brighton, MN (US)

(73) Assignee: MEDIVIEW XR, INC., Cleveland, OH (US)

( * ) Notice: Subject to any disclaimer, the term of this patent is extended or adjusted under 35 U.S.C. 154(b) by 90 days.

(21) Appl. No.: 17/163,975

(22) Filed: Feb. 1, 2021

(65) Prior Publication Data

US 2021/0236209 A1 Aug. 5, 2021

Related U.S. Application Data

(60) Provisional application No. 62/969,035, filed on Feb. 1, 2020.

(51) Int. Cl.
*A61B 34/20* (2016.01)
*A61B 5/055* (2006.01)
(Continued)

(52) U.S. Cl.
CPC .............. *A61B 34/20* (2016.02); *A61B 5/055* (2013.01); *A61B 5/062* (2013.01); *A61B 6/032* (2013.01);
(Continued)

(58) Field of Classification Search
None
See application file for complete search history.

(56) References Cited

U.S. PATENT DOCUMENTS

2002/0049375 A1 4/2002 Strommer et al.
2009/0237759 A1 9/2009 Maschke
(Continued)

FOREIGN PATENT DOCUMENTS

CN 110650703 A 1/2020
JP 2009018184 A 1/2009
(Continued)

OTHER PUBLICATIONS

Linte, Cristian A., et al., "Inside the beating heart: An in vivo feasibility study on fusing pre-and intra-operative imaging for minimally invasive therapy", International journal of computer assisted radiology and surgery 4, No. 2 (2009): 113-123, https://doi.org/10.1007/s11548-008-0278-6.

*Primary Examiner* — Christopher Koharski
*Assistant Examiner* — Renee C Langhals
(74) *Attorney, Agent, or Firm* — Jacob M. Ward; Ward Law Office LLC

(57) ABSTRACT

A system and method for performing a structural heart repair or replacement procedure on a patient includes an augmented reality system, a tracked instrument, a first image acquisition system, and a computer system. The method includes a step of acquiring the first holographic image dataset from the patient. The computer system tracks, in a next step, the tracked instrument using the plurality of sensors to provide a tracked instrument dataset. The method also includes a step of registering the first holographic image dataset and the tracked instrument dataset with the patient. The augmented reality system then renders, in a next step, a first hologram based on the first holographic image dataset from the patient for viewing by a practitioner. The practitioner is thereby permitted to perform the procedure on the patient while viewing the patient and the first hologram with the augmented reality system.

19 Claims, 5 Drawing Sheets

(51) Int. Cl.
*A61B 5/06* (2006.01)
*A61B 6/03* (2006.01)
*A61B 8/14* (2006.01)
*A61B 90/00* (2016.01)
*A61F 2/24* (2006.01)

(52) U.S. Cl.
CPC .............. *A61B 8/14* (2013.01); *A61B 90/36* (2016.02); *A61F 2/2412* (2013.01); *A61F 2/2427* (2013.01); *A61B 2034/2051* (2016.02); *A61B 2034/2055* (2016.02); *A61B 2034/2063* (2016.02); *A61B 2090/365* (2016.02)

(56) References Cited

U.S. PATENT DOCUMENTS

| | | | |
|---|---|---|---|
| 2012/0087563 A1 | 4/2012 | Ionasec et al. | |
| 2014/0031668 A1 | 1/2014 | Mobasser et al. | |
| 2014/0088417 A1* | 3/2014 | Alhumaid | A61B 17/3478 600/431 |
| 2014/0282008 A1 | 9/2014 | Verard et al. | |
| 2015/0049081 A1 | 2/2015 | Coffey et al. | |
| 2015/0049083 A1* | 2/2015 | Bidne | A61B 34/10 345/420 |
| 2015/0190207 A1 | 7/2015 | Zentgraf et al. | |
| 2017/0056115 A1* | 3/2017 | Corndorf | A61N 1/372 |
| 2017/0258521 A1* | 9/2017 | Asirvatham | A61B 17/00234 |
| 2018/0200018 A1 | 7/2018 | Silva et al. | |
| 2018/0303377 A1 | 10/2018 | West et al. | |
| 2018/0303563 A1 | 10/2018 | West et al. | |
| 2018/0357825 A1* | 12/2018 | Hofmann | A61B 34/20 |
| 2019/0060003 A1* | 2/2019 | Tuason | A61B 34/20 |
| 2019/0110848 A1* | 4/2019 | Popovic | A61F 2/2427 |
| 2019/0183576 A1 | 6/2019 | Fahim et al. | |
| 2019/0183577 A1 | 6/2019 | Fahim et al. | |
| 2019/0339525 A1* | 11/2019 | Yanof | A61B 8/466 |
| 2021/0137634 A1* | 5/2021 | Lang | A61B 90/13 |

FOREIGN PATENT DOCUMENTS

| | | |
|---|---|---|
| JP | 2019503766 A | 2/2019 |
| WO | 2019051464 A1 | 3/2019 |

\* cited by examiner

REAL TIME FUSED HOLOGRAPHIC VISUALIZATION AND GUIDANCE FOR DEPLOYMENT OF STRUCTURAL HEART REPAIR OR REPLACEMENT PRODUCT

CROSS REFERENCE TO RELATED APPLICATIONS

This application claims the benefit of U.S. Provisional Application Ser. No. 62/969,035, filed on Feb. 1, 2020. The entire disclosure of the above application is hereby incorporated herein by reference.

FIELD

The present disclosure relates to holographic augmented reality applications and, more particularly, medical applications employing holographic augmented reality.

INTRODUCTION

This section provides background information related to the present disclosure which is not necessarily prior art.

Image-guided surgery has become standard practice for many different procedures, such as structural heart repairs. Image-guided surgery visually correlates intraoperative data with preoperative data. The use of image-guided surgeries has been shown to increase the safety and the success of these procedures. However, there are many known difficulties that can arise during image-guided surgeries.

For instance, how the intraoperative data and preoperative is shown to the practitioner can directly correlate to the surgical performance of the practitioner. Typically, this information is shown on two dimensional (2D) displays that are positioned around a patient. Undesirably, this shifts the focus of the practitioner from the patient to the 2D displays. Also, this can place additional stress on the neck of the practitioner due to the practitioner having to constantly glance up at the 2D display while performing the procedure.

In addition, determining the optimal angle of instrument insertion can be difficult because of the how the intraoperative data and preoperative data is displayed. As mentioned previously, this data is typically shown in 2D, meaning the practitioner must mentally translate the position and the trajectory of the instrument relative to the data shown on the 2D display. This can undesirably lead to confusion and errors due to the position and trajectory being poorly translated into 2D.

There is a continuing needed for a visualization, guidance, and navigation method and system for a structural heart repair or replacement that involves holographic augmented reality, allowing the practitioner to view operating data and the patient within the same field of view. Desirably the system and method allow a practitioner to determine the position and trajectory of an instrument more easily during a procedure.

SUMMARY

In concordance with the instant disclosure, a visualization, guidance, and navigation system and method for a structural heart repair or replacement that involves holographic augmented reality, allowing a practitioner to view operating data and the patient within the same field of view, and which allows the practitioner to determine the position and trajectory of an instrument more easily during a procedure, has been surprisingly discovered.

In one embodiment, a method for performing a structural heart repair or replacement procedure on a patient includes a step of providing an augmented reality system, a tracked instrument, a first image acquisition system, and a computer system. The computer systems has a processor and a memory. The tracked instrument has a plurality of sensors. The first image acquisition system is configured for acquiring a first holographic image dataset from the patient. The computer system is in communication with the augmented reality system, the tracked instrument, and the first image acquisition system. The method may include acquiring, by the first image acquisition system, the first holographic image dataset from the patient. The method may also include tracking, by the computer system, the tracked instrument using the plurality of sensors to provide a tracked instrument dataset. The method may further include registering, by the computer system, the first holographic image dataset and the tracked instrument dataset with the patient. The method may additionally include rendering, by the augmented reality system, a first hologram based on the first holographic image dataset from the patient for viewing by a practitioner. The method may also include performing, by the practitioner, the structural heart repair or replacement procedure on the patient while viewing the patient and the first hologram with the augmented reality system. The practitioner thereby employs the augmented reality system for at least one of visualization, guidance, and navigation of the tracked instrument during the structural heart repair or replacement procedure.

In a further embodiment, a system for performing a structural heart repair or replacement procedure on a patient includes an augmented reality system, a tracked instrument, a first image acquisition system, and a computer system. The tracked instrument has a plurality of sensors, which are employed for the detection of the location and orientation of the tracked instrument by the computer system. The first image acquisition system is configured to acquire a first holographic image dataset from the patient. The computer system has a processor and a memory, and is in communication with the augmented reality system, the tracked instrument, and the first image acquisition system. The computer system is configured by machine-readable instructions to: track the tracked instrument using the plurality of sensors to provide a tracked instrument dataset; and register the first holographic image dataset and the tracked instrument dataset with the patient. The augmented reality system is configured to render a first hologram based on the first holographic image dataset from the patient for viewing by a practitioner. The practitioner is thereby permitted to perform the structural heart repair or replacement procedure on the patient while viewing the patient and the first hologram with the augmented reality system. In particular, the practitioner employs the augmented reality system for at least one of visualization, guidance, and navigation of the tracked instrument during the structural heart repair or replacement procedure.

In an exemplary embodiment, the present disclosure allows for holographic display of an intended trajectory of a tracked instrument by using spatial computing, augmented reality, and artificial intelligence (AI) to produce a holographic light ray to mimic intended trajectory of the tracked instrument. The system and method may be used with any augmented reality display and optionally uses electromagnetic or optical tracking. This permits for the holographic light ray to be adapted to any instrument by design, adjusted to any desired angle, and sized to accommodate any desired needle, catheter, or trocar size.

It should be appreciated that the present disclosure solves a significant problem associated with navigation, guidance and position of a structural heart repair or replacement product. Visualization and orientation of the therapy and tool is permitted via holographic visualization and access to the heart via transapical or transaortic approach technique or transfemoral approach. The present disclosure provides a comprehensive tool for at least one of planning, sizing, and pre-orienting an implant or therapy delivery, a percutaneous entry point, and a real time navigation and guidance by merging or fusing transesophageal echocardiography, transabdominal echocardiography, CT, or MRI image with data from a wired and wireless electromagnetic or optical tracking system.

The present disclosure also allows for pre-planning of an optimal angle of instrument or implant insertion. Known standard of care has relied upon the use of the 2D image acquisition to achieve appropriate access, guidance and delivery of therapy or device. The holography of the present disclosures advantageously provides for a real time view by fusing pre-operative imaging with real time echocardiography, which is holographically displayed and accurately registered to the patient using electromagnetic tracking or optical tracking. Holographic representation of the cardiac gating may also allow for deeper interventionalist understanding of the full motion range of the heart. Holographic fusion of CT images to the intraoperative fluoroscopic imaging to model heart motion associated with cardiac cycle is also contemplated.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a schematic illustration of a holographic augmented reality visualization and guidance system for a structural heart repair or replacement according to one embodiment of the disclosure, and further showing an augmented reality system, a tracked instrument, a computer system, a first image acquisition system, and a second image acquisition system in communication with one another via a computer network;

DETAILED DESCRIPTION

Figure 1:
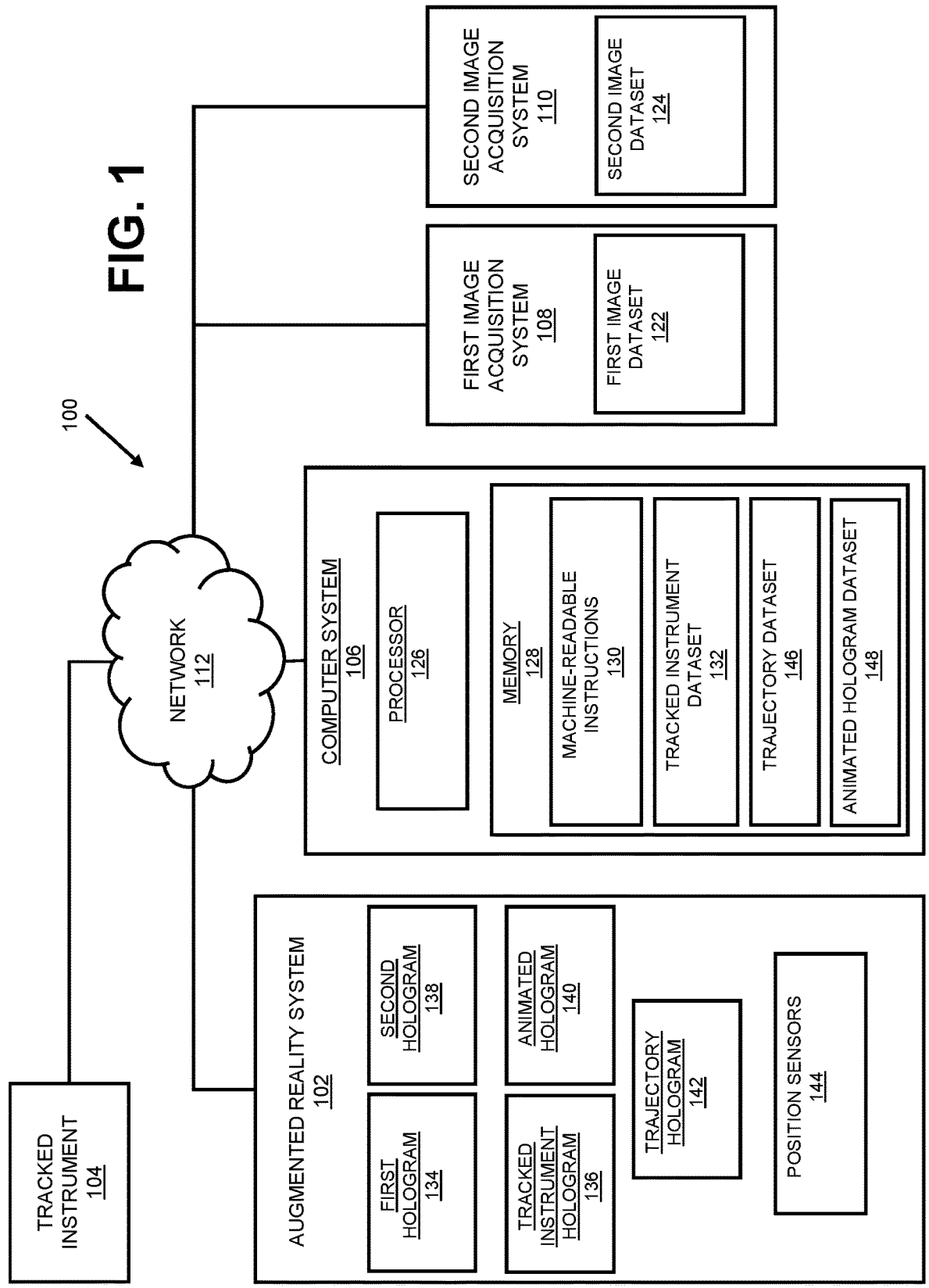

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature unless otherwise disclosed, and thus, the order of the steps can be different in various embodiments, including where certain steps can be simultaneously performed.

I. Definitions

Unless otherwise defined, all technical terms used herein have the same meaning as commonly understood by one of ordinary skill in the art to which the present disclosure pertains.

As used herein, the terms "a" and "an" indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "percutaneous" refers to something that is made, done, or effected through the skin.

As used herein, the term "percutaneous medical procedure" refers to accessing the internal organs or tissues via needle-puncture of the skin, rather than by using an open approach where the internal organs or tissues are exposed (typically with a scalpel).

As used herein, the term "non-vascular" when used with "percutaneous medical procedure" refers to a medical procedure performed on any portion of the subject's body distinct from the vasculature that is accessed percutaneously. Examples of percutaneous medical procedures can include a biopsy, a tissue ablation, a cryotherapy procedure, a brachytherapy procedure, an endovascular procedure, a drainage procedure an orthopedic procedure, a pain management procedure, a vertebroplasty procedure, a pedicle/screw placement procedure, a guidewire-placement procedure, a SI-Joint fixation procedure, a training procedure, or the like.

As used herein, the term "endovascular" when used with "percutaneous medical procedure" refers to a medical procedure performed on a blood vessel (or the lymphatic system) accessed percutaneously. Examples of endovascular percutaneous medical procedures can include an aneurism repair, a stent grafting/placement, a placement of an endovascular prosthesis, a placement of a wire, a catheterization, a filter placement, an angioplasty, or the like.

As used herein, the terms "interventional device" or "tracked instrument" refers to a medical instrument used during the non-vascular percutaneous medical procedure.

As used herein, the term "tracking system" refers to something used to observe one or more objects undergoing motion and supply a timely ordered sequence of tracking data (e.g., location data, orientation data, or the like) in a tracking coordinate system for further processing. As an example, the tracking system can be an electromagnetic tracking system that can observe an interventional device equipped with a sensor-coil as the interventional device moves through a patient's body.

As used herein, the term "tracking data" refers to information recorded by the tracking system related to an observation of one or more objects undergoing motion.

As used herein, the term "tracking coordinate system" refers to a 3D Cartesian coordinate system that uses one or more numbers to determine the position of points or other geometric elements unique to the particular tracking system. For example, the tracking coordinate system can be rotated, scaled, or the like, from a standard 3D Cartesian coordinate system.

As used herein, the term "head-mounted device" or "headset" or "HMD" refers to a display device, configured to be worn on the head, that has one or more display optics (including lenses) in front of one or more eyes. These terms may be referred to even more generally by the term "augmented reality system," although it should be appreciated that the term "augmented reality system" is not limited to display devices configured to be worn on the head. In some instances, the head-mounted device can also include a non-transitory memory and a processing unit. An example of a suitable head-mounted device is a Microsoft HoloLens®.

As used herein, the terms "imaging system," "image acquisition apparatus," "image acquisition system" or the like refer to technology that creates a visual representation of the interior of a patient's body. For example, the imaging system can be a computed tomography (CT) system, a fluoroscopy system, a magnetic resonance imaging (MRI) system, an ultrasound (US) system, or the like.

As used herein, the terms "coordinate system" or "augmented realty system coordinate system" refer to a 3D Cartesian coordinate system that uses one or more numbers to determine the position of points or other geometric elements unique to the particular augmented reality system or image acquisition system to which it pertains. For example, the headset coordinate system can be rotated, scaled, or the like, from a standard 3D Cartesian coordinate system.

As used herein, the terms "image data" or "image dataset" or "imaging data" refers to information recorded in 3D by the imaging system related to an observation of the interior of the patient's body. For example, the "image data" or "image dataset" can include processed two-dimensional or three-dimensional images or models such as tomographic images, e.g., represented by data formatted according to the Digital Imaging and Communications in Medicine (DICOM) standard or other relevant imaging standards.

As used herein, the terms "imaging coordinate system" or "image acquisition system coordinate system" refers to a 3D Cartesian coordinate system that uses one or more numbers to determine the position of points or other geometric elements unique to the particular imaging system. For example, the imaging coordinate system can be rotated, scaled, or the like, from a standard 3D Cartesian coordinate system.

As used herein, the terms "hologram", "holographic," "holographic projection", or "holographic representation" refer to a computer-generated image projected to a lens of a headset. Generally, a hologram can be generated synthetically (in an augmented reality (AR)) and is not related to physical reality.

As used herein, the term "physical" refers to something real. Something that is physical is not holographic (or not computer-generated).

As used herein, the term "two-dimensional" or "2D" refers to something represented in two physical dimensions.

As used herein, the term "three-dimensional" or "3D" refers to something represented in three physical dimensions. An element that is "4D" (e.g., 3D plus a time and/or motion dimension) would be encompassed by the definition of three-dimensional or 3D.

As used herein, the term "integrated" can refer to two things being linked or coordinated. For example, a coil-sensor can be integrated with an interventional device.

As used herein, the term "degrees-of-freedom" or "DOF" refers to a number of independently variable factors. For example, a tracking system can have six degrees-of-freedom (or 6DOF), a 3D point and 3 dimensions of rotation.

As used herein, the term "real-time" refers to the actual time during which a process or event occurs. In other words, a real-time event is done live (within milliseconds so that results are available immediately as feedback). For example, a real-time event can be represented within 100 milliseconds of the event occurring.

As used herein, the terms "subject" and "patient" can be used interchangeably and refer to any vertebrate organism.

As used herein, the term "registration" refers to steps of transforming tracking data and body image data to a common coordinate system and creating a holographic display of images and information relative to a body of a physical patient during a procedure, for example, as further described in U.S. Patent Application Publication No. 2018/0303563 to West et al., and also applicant's co-owned U.S. patent application Ser. No. 17/110,991 to Black et al. and U.S. patent application Ser. No. 17/117,841 to Martin III et al., the entire disclosures of which are hereby incorporated herein by reference.

II. Systems for Structure Heart Repair or Replacement

As shown in FIG. 1, a holographic augmented reality visualization and guidance system 100 for performing a structural heart repair or replacement procedure (200, shown in FIG. 2) on a patient includes an augmented reality system 102, a tracked instrument 104, a computer system 106, and a first image acquisition system 108. In certain examples, the holographic augmented reality visualization and guidance system 100 may further include a second image acquisition system 110. Each of the augmented reality system 102, the tracked instrument 104, the first image acquisition system 108, and the second image acquisition system 110 may be selectively or permanently in communication with the computer system 106, for example, via a computer network 112. Other suitable instruments, tools, equipment, sub-systems, and the like for use with the holographic augmented reality visualization and guidance system 100, as well as other network means including wired and wireless means of communication between the components of the holographic augmented reality visualization and guidance system 100, may also be employed by the skilled artisan, as desired.

Figure 2:
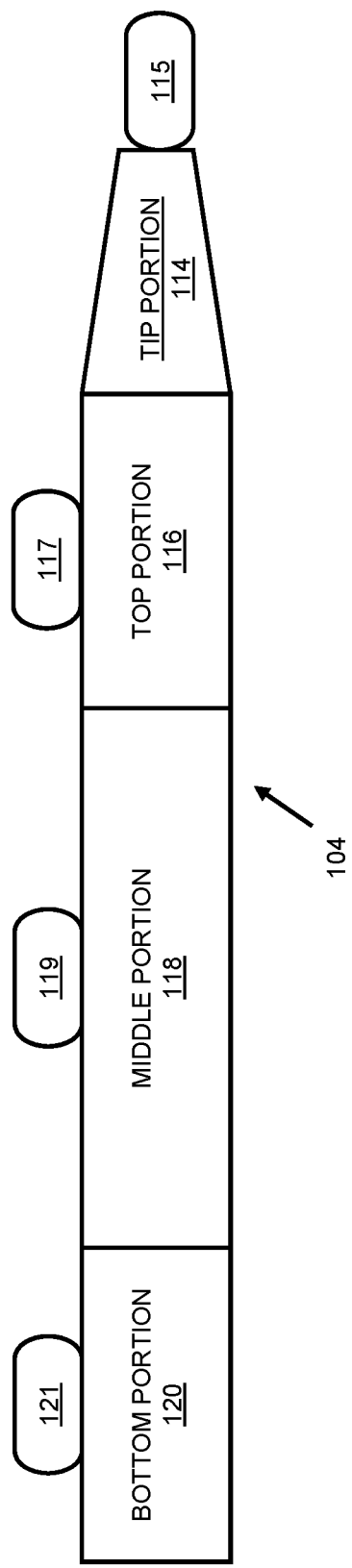
FIG. 2 is a schematic illustration of a tracked instrument shown in FIG. 1, according to one embodiment of the disclosure.

With reference to FIG. 2, the tracked instrument 104 is an interventional device that is sensorized so that that both location and orientation of the tracked instrument 104 may be determined by the computer system 106. In particular, the tracked instrument may have an elongate body, such as long flexible tube, with a plurality of portions 114, 116, 118, 120 disposed along a length of the elongate body, which in turn each have one of a plurality of sensors 115, 117, 119, 121. For example, the tracked instrument 104 may have a tip portion 114, a top portion 116, a middle portion 118, and a bottom portion 120. A tip sensor 115 may be disposed at the tip portion 114 of the tracked instrument 104. A top portion sensor 117 may be disposed at the top portion 116 of the tracked instrument 104. A middle portion sensor 119 may be disposed at the middle portion 118 of the tracked instrument 104. A bottom portion sensor 121 may be disposed at the bottom portion 120 of the tracked instrument 104. Each of the sensors 115, 117, 119, 121 is in communication with or otherwise detectable by the computer system 106.

It should be appreciated that the tracking provided by the tip sensor 115 is especially advantageous as this can be used by the practitioner as a preselected reference point for the tracked instrument 104. The preselected reference point is configured to be an anchoring point for a trajectory hologram (shown in FIG. 1 and described herein as "142") such as a holographic light ray that may be generated by the augmented reality system 102. The holographic light ray may assist the practitioner with the alignment and movement of the tracked instrument 104 along a preferred pathway or trajectory, as described further herein. It should be appreciated that one skilled in the art may also select any number of preselected reference points, within the scope of this disclosure. In further embodiments, the preselected reference point may be adjusted in real-time by the practitioner during the medical procedure, and may alternatively be based on one or more of the other sensors 115, 117, 119, 121, as desired.

In certain examples, the sensors 115, 117, 119, 121 may be part of an electromagnetic (EM) tracking system that can be part of and/or used by the computer system 106 to detect the location and orientation of a physical tracked instrument 104. For example, the sensors 115, 117, 119, 121 may include one or more sensor-coils. The computer system 106 can detect the one or more sensor-coils and provide tracking data (e.g., with six degrees of freedom) in response to the detection. For example, the tracking data can include real-time 3D position data and real-time 3D orientation data. The tracking system of the computer system 106 can also detect coil-sensors that are not located on the physical interventional device (e.g., located on fiducial markers or other imaging targets).

Further, the plurality of positional sensors 115, 117, 119, 121 are configured to assess various additional information of the tracked instrument 104, such as angular velocity and acceleration of the tracked instrument 104. Nonlimiting examples of the plurality of positional sensors 115, 117, 119, 121 suitable for determining angular velocity and acceleration include accelerometers, gyroscopes, electromagnetic sensors, and optical tracking sensors. Notably, the electromagnetic sensors enable more precise real-time object tracking of small objects without line-of-sight restrictions.

Other suitable tracking systems such as optical tracking systems used in conjunction with the augmented reality system 102 and the computer system 106 are specifically contemplated. Embodiments where the tracked instrument 104 may communicate by transmission wirelessly or through a wired connection with the augmented reality system 102 and the computer system 106 are further contemplated. It should also be appreciated that a skilled artisan may employ different types of plurality of positional sensors 115, 117, 119, 121, as desired.

The tracked instrument 104 may further contain an implant or a tool that is configured to be inserted into the heart of the patient. Nonlimiting examples of the tracked instrument 104 and associated implant include needles, catheters, stents, mechanical heart valves, or biological heart valves. In other examples, the implants themselves may be sensorized at least temporarily during the procedure to facilitate the tracking of the same.

In most particular examples, the tracked instrument 104 is a catheter configured for insertion of a cardiac implant such as a replacement valve into the heart of the patient. In other examples, the tracked instrument 104 is a catheter configured for use in a cardiac ablation procedure. However, one of ordinary skill in the art may employ other suitable interventional devices for the tracked instrument 104, depending on the desired procedure, within the scope of the present disclosure.

With renewed reference to FIG. 1, the first image acquisition system 108 is configured to acquire a first holographic image dataset 122 from the patient. In particular, the first image acquisition system 108 may be configured to acquire the first holographic image dataset 122 from the patient in a preoperative manner. In certain embodiments, the first image acquisition system 108 is one of a magnetic resonance imaging (MRI) apparatus and a computerized tomography (CT) apparatus. Other suitable types of instrumentation for the first image acquisition system 108 may also be employed, as desired.

Likewise, the second image acquisition system 110 is configured to acquire a second holographic image dataset 124 from the patient. In particular, the second image acquisition system 110 may be configured to acquire the second holographic image dataset 124 from the patient in an intraoperative manner, and most particularly in real-time as the procedure is being undertaken. In certain embodiments, the second image acquisition system 110 is an ultrasound echocardiogram (ECG) imaging apparatus. Most particularly, the second holographic image dataset 124 may be acquired by a predetermined modality including one of a transthoracic echocardiogram (TTE), a transesophageal echocardiogram (TEE), and an intracardiac echocardiogram (ICE). Other suitable types of instrumentation and modalities for the second image acquisition system 110 may also be employed, as desired.

Although use of both the first image acquisition system 108 and the second image acquisition system 110 is shown and described herein, embodiments in which only one or the other of the first image acquisition system 108 and the second image acquisition system 110 is employed, are considered to be within the scope of the present disclosure.

With continued reference to FIG. 1, the computer system 106 of the present disclosure has at least one processor 126 and at least one memory 128 on which tangible, non-transitory, machine-readable instructions 130 are stored.

The one or more processors 126 may perform functions associated with the operation of the holographic augmented reality visualization and guidance system 100. The one or more processors 126 may be any type of general or specific purpose processor. In some cases, multiple processors 126 may be utilized according to other embodiments. In fact, the one or more processors 126 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as non-limiting examples.

The memory 128 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, the memory 128 can consist of any combination of random access memory (RAM), read only memory (ROM), static storage such as a magnetic or optical disk, hard disk drive (HDD), or any other type of non-transitory machine or computer readable media. The instructions stored in the memory 128 may include program instructions or computer program code that, when executed by one or more processors 126, enable the holographic augmented reality visualization and guidance system 100 to perform tasks as described herein.

The machine-readable instructions 130 may include modules. The modules may be implemented as one or more of functional logic, hardware logic, electronic circuitry, software modules, and the like. The modules may include one or more of an augmented reality system module, an image acquiring module, an instrument tracking module, an image dataset registering module, a hologram rendering module, an image registering module, a trajectory hologram rendering module, and/or other suitable modules, as desired.

The computer system 106 is in communication with the augmented reality system 102, the tracked instrument 104, and the first image acquisition system 108, and the second image acquisition system 110, for example, via the network 112, and is configured by the machine-readable instructions 130 to operate in accordance with the method 200 as described further herein. The computer system 106 may be separately provided and spaced apart from the augmented reality system 102, or may be provided together with the augmented reality system 102 as a singular one-piece unit, as desired.

It should be appreciated that the network 112 of the holographic augmented reality visualization and guidance system 100 may include a radio access network, such as LTE or 5G, a local area network (LAN), a wide area network (WAN) such as the Internet, or wireless LAN (WLAN), as non-limiting examples. It will be appreciated that this is not intended to be limiting, and that the scope of this disclosure includes implementations in which one or more computing platforms of the holographic augmented reality visualization and guidance system 100 may be operatively linked via some other communication coupling. The one or more one or more computing platforms may be configured to communicate with the networked environment via wireless or wired connections. In addition, in an embodiment, the one or more computing platforms may be configured to communicate directly with each other via wireless or wired connections. Examples of one or more computing platforms may include, but is not limited to, smartphones, wearable devices, tablets, laptop computers, desktop computers, Internet of Things (IoT) device, or other mobile or stationary devices such as standalone servers, networked servers, or an array of servers.

In particular embodiments, the computer system 106 may be configured to track the tracked instrument 104 using the plurality of sensors 115, 117, 119, 121 to provide a tracked instrument dataset 132. The tracked instrument dataset 132 may be stored on the memory 128. In particular, the location and orientation of the tracked instrument 104 in physical space, for example, is stored as the tracked instrument dataset 132.

The computer system 106 may further be configured to register the first holographic image dataset 122 from the first image acquisition system 108 and the tracked instrument dataset 132 obtained by the computer system 106 with the patient, as also described further herein.

With continued reference to FIG. 1, the augmented reality system 102 is configured to render a plurality of holograms 134, 136, 138, 140, 142 in accordance with the method 200 of the present disclosure. In particular, the augmented reality system 102 may be a mixed reality (MR) display such as a MR smart glasses or a MR head-mounted display. Nonlimiting examples of the augmented reality system 102 include the Magic Leap One® or the Microsoft HoloLens®. It should be appreciated that other types of MR displays may be used for the augmented reality system 102, as long as they are capable of superimposing computer-generated imagery over real-world objects. Additionally, although the augmented reality system 102 is described primarily herein as being a head-mounted display, it should be understood that other types of display that are not head-mounted but which are capable of generating and superimposing the holograms 134, 136, 138, 140 over the real-world views may also be employed, as desired.

It should be appreciated that in instances where the augmented reality system 102 does not contain the computer system 100, the augmented reality system 102 may further include an additional non-transitory memory and a processing unit (that may include one or more hardware processors) that can aid in the rendering or generation of holograms 134, 136, 138, 140, 142. The augmented reality system 102 can also include a camera to record one or more images, one or more image-generation components to generate/display a visualization of the holograms 134, 136, 138, 140, 142, and/or other visualization and/or recording elements.

In yet further examples, it should be appreciated that the augmented reality system 102 may also include a plurality of positional sensors 144. The plurality of positional sensors 144 of the augmented reality system 102 are configured to determine various positional information for the augmented reality system 102, such as the approximated position in three-dimensional (3D) space, the orientation, angular velocity, and acceleration of the augmented reality system 102. In particular, it should be understood that this allows the holographic imagery to be accurately displayed on the field of view of the practitioner, in operation.

Nonlimiting examples of the plurality of positional sensors 144 include accelerometers, gyroscopes, electromagnetic sensors, and optical tracking sensors. It should further be appreciated that a skilled artisan may employ different types and numbers of the plurality of positional sensors 144 of the augmented reality system 102, for example, as required by the procedure or situation within which the augmented reality system 102 is being used.

As shown in FIG. 1, for example, the holograms 134, 136, 138, 140, 142 generated by the augmented reality system 102 may include a first hologram 134, a tracked instrument hologram 136, a second hologram 138, an animated hologram 140, and a trajectory hologram 142. The first hologram 134 generated by the augmented reality system 102 may be based on the first holographic image dataset 122 from the patient. The tracked instrument hologram 136 generated by the augmented reality system 102 may be based on the tracked instrument dataset 132. The second hologram 138 generated by the augmented reality system 102 may be based on the second holographic image dataset 124. The animated hologram 140 may be based on a processing by the computer system 106 of the second holographic image dataset 124 to provide an animated hologram dataset 148 as described further herein. The trajectory hologram 142 may be based on a trajectory dataset 146, which may be either manually or automatically selected and stored on the memory 128 of the computer system 106, as described further herein.

The augmented reality system 102 may further be configured to, in addition to rendering or generating the various holograms 134, 136, 138, 140, 142, show a plurality of operating information or details to the practitioner. For example, the augmented reality system 102 may project the plurality of operating information over real-world objects, such as the patient. The operating information may include real-time navigation instructions or guidance for the trajectory to be employed, for example. It should be appreciated that the augmented reality system 102 may project the plurality of operating information over various real-world objects such as the tracked instrument 104, as well as over the various holograms 134, 136, 138, 140, 142 rendered, as desired.

Desirably, this generating of the operating information or details allows the practitioner to simultaneously view the patient and the plurality of operating information is the same field of view. Also, the generating of the operating information or details together with the various holograms 134, 136, 138, 140, 142 permits the practitioner to plan, size, or pre-orient the tracked instrument 104 in operation.

As shown in FIG. 1, the computer system 106 is in communication with the augmented reality system 102 and the tracked instrument 104. The computer system 106 is configured to store and generate the plurality of operating information, either thorough manual intervention by the practitioner or other medical professionals, or automatically based on the machine-readable instructions 130 encoded onto the memory 128. For example, the plurality of operating information may be generated in the augmented reality system 102 depending on a sensor-determined position or orientation of the tracked instrument 104 such as by algorithms, artificial intelligence (AI) protocols, or other practitioner-inputted data or thresholds.

In addition, the computer system 106 is further configured to permit the practitioner to selectively adjust the plurality of operating information in real-time. For example, the practitioner may be able to adjust the position or orientation of the trajectory hologram 142. In addition, the practitioner may be able to decide which of the plurality of operating data is actively being shown to the practitioner. It should be appreciated that other settings and attributes of the plurality of operating information may be adjusted by practitioner in real-time, within the scope of this disclosure.

In particular, it should be understood that the augmented reality system 102 of the present disclosure advantageously permits the practitioner to perform the method 200 for structural heart repair or replacement on the patient while viewing the patient and the first hologram 134, and optionally the instrument hologram 136, with the augmented reality system 102. Likewise, the practitioner is advantageously permitted to employ the augmented reality system 102 for at least one of visualization, guidance, and navigation of the tracked instrument 104 during the structural heart repair or replacement procedure, as described further herein with respect to the method 200 of the disclosure.

III. Methods for Structure Heart Repair or Replacement

Figure 3:
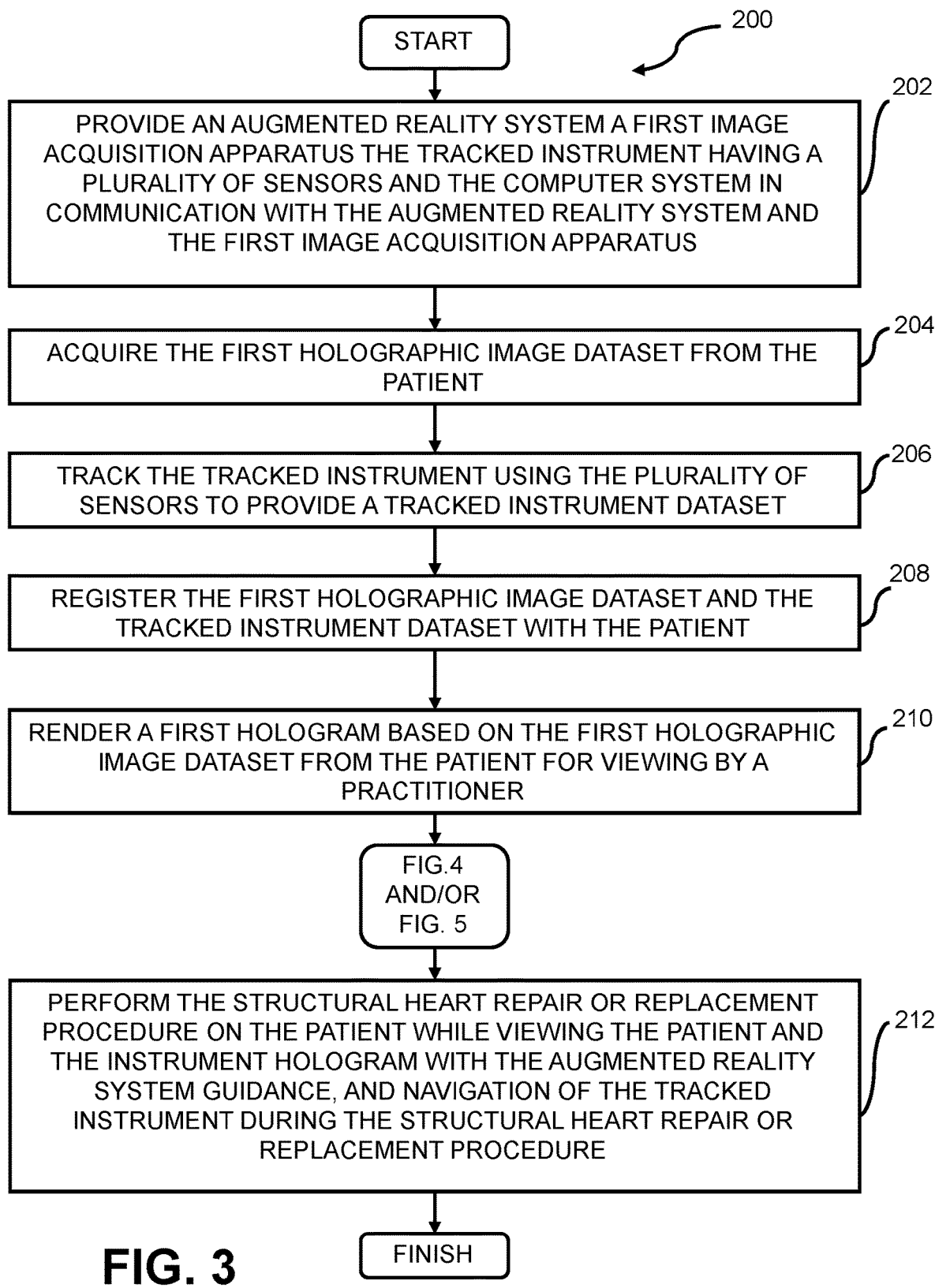
FIG. 3 is a flowchart showing a method for performing a structural heart repair or replacement procedure according to one embodiment of the disclosure.

FIG. 3 illustrates an example flow diagram of the method 200, according to one embodiment of the present disclosure. The method 200 may include a first step 202 of providing the holographic augmented reality visualization and guidance system 100 as described herein.

In a second step 204, the method 200 may then include acquiring, by the first image acquisition system 108, the first holographic image dataset 122 from the patient. The method 200 may include a third step 206 of tracking, by the computer system 106, the tracked instrument 104 using the plurality of sensors 115, 117, 119, 121 to provide a tracked instrument dataset 132.

The method 200 may then include a fourth step 208 of registering, by the computer system 106, the first holographic image dataset 122 and the tracked instrument dataset 132 with the patient.

In a fifth step 210, the method 200 may then include rendering, by the augmented reality system 102, the first hologram 134 based on the first holographic image dataset 122 from the patient for viewing by a practitioner. Optionally, the tracked instrument hologram 136 may also be rendered in the fifth step 210 based on the tracked instrument dataset 132, also for viewing by a practitioner. Where the instrument hologram 134 is shown, it should be appreciated that the practitioner may employ the visualization of the same to assist in the positioning of the real-world tracked instrument 104.

The method 200 may then include in a sixth step 212 of performing, by the practitioner, the structural heart repair or replacement procedure on the patient while viewing the patient and the first hologram 134, and optionally the instrument hologram 136, with the augmented reality system 102. Under the sixth step 212, the practitioner employs the augmented reality system 102 for at least one of visualization, guidance, and navigation of the tracked instrument 104 during the structural heart repair or replacement procedure.

It should be appreciated that the at least one of visualization, guidance, and navigation of the tracked instrument 104 during the structural heart repair or replacement procedure may also advantageously involve further steps that account for an intraprocedural movement of the patient during the procedure.

Figure 4:
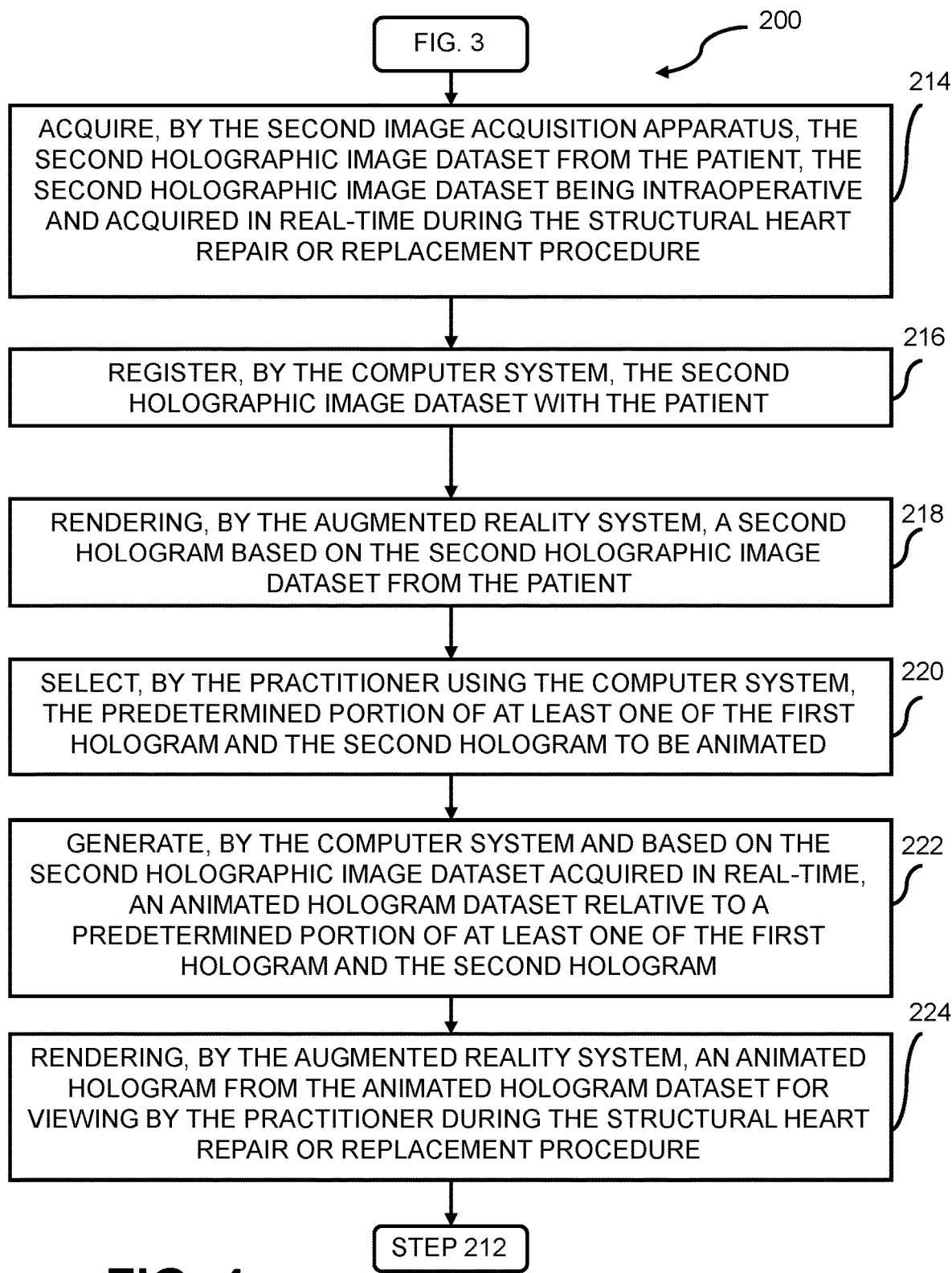
FIG. 4 is another flowchart showing additional steps of the method for performing a structural heart repair or replacement procedure shown in FIG. 3.

In one example, as shown in FIG. 4, the method 200 may further include a seventh step 214 of acquiring, by the second image acquisition system 110, the second holographic image dataset 124 from the patient. In particular, the second holographic image dataset 124 may be intraoperative and acquired in real-time during the structural heart repair or replacement procedure. Upon the second holographic image dataset 124 being acquired, the method may further includes an eighth step 216 of registering, by the computer system 106, the second holographic image dataset 124 with the patient. Following the registration of the second holographic image dataset 124, the method may include a ninth step 218 of rendering, by the augmented reality system 102, a second hologram 138 based on the second holographic image dataset 124 from the patient.

The method 200 may then further include a tenth step 220 of selecting, by the computer system 106, either automatically or manually, a predetermined portion (not shown) of at least one of the first hologram 134 and the second hologram 138 to be animated, for example, according to the machine-readable instructions 130 stored in the memory 128 of the computer system 106. As non-limiting examples, the computer system 106 may also merge, stitch, or otherwise digitally combine the first hologram 134 and the second hologram 138, either automatically or manually, to provide a fused or combined hologram so that the practitioner may select with the computer system 106 the predetermined portion of the combined hologram for animation. In certain embodiments, the predetermined portion is associated with one of a heart and a chest of the patient. Where the predetermined portion is associated with the heart of the patient, the animated hologram 140 generated by the computer system 106 may depict a beating rhythm movement of the heart. Where the predetermined portion is associated with the chest of the patient, the animated hologram 140 generated by the computer system 106 may depict a respiration cycle movement of the chest.

In a particular example, the animation ma be based on the real-time imaging of the heart via the second image acquisition system 110, such as the ultrasound ECG, to permit for the animated hologram 140 to beat in rhythm with the heart of the patient in real-time. In yet another example, the animation may be based on a holographic representation of cardiac gating, for example, from a gated CT scan that measures the respiration cycle relative to the start (atrial systolic) and end (atrial diastolic) of the cardiac cycle. This may allow for a more thorough understanding of the full motion range of the heart of the patient.

With further reference to FIG. 4, the method may further include an eleventh step 222 of generating, by the computer system 106 and based on the second holographic image dataset 124 acquired in real-time, an animated hologram dataset 148 relative to a predetermined portion of at least one of the first hologram 134 and the second hologram 138. Following the generation of the animated hologram dataset 148, the method 200 may further include a twelfth step 224 of rendering, by the augmented reality system 102, an animated hologram 140 from the animated hologram dataset for viewing by the practitioner during the structural heart repair or replacement procedure.

Advantageously, by allowing the practitioner to view the animated hologram 140, either in addition to or in lieu of a stationary or otherwise static forms of the first hologram 134 and the second hologram 138, the practitioner may insert the tracked instrument 104 into the patient and/or deploy the associated implant with more confidence compared to conventional procedures without the system 100.

It should be appreciated that the at least one of visualization, guidance, and navigation of the tracked instrument 104 during the structural heart repair or replacement procedure may advantageously involve further steps that permit for predetermination or planning and optimization of both a percutaneous entry point and a trajectory for the tracked instrument prior to and/or during the procedure.

Figure 5:
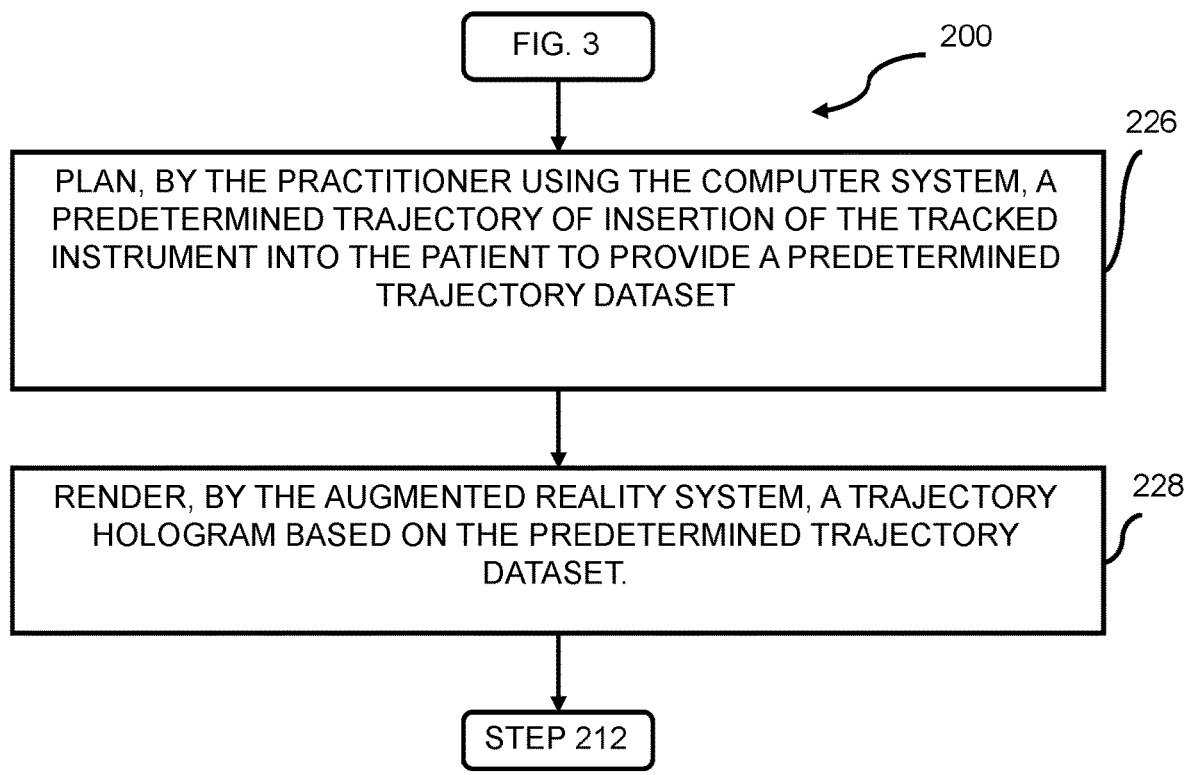
FIG. 5 is yet another flowchart showing additional steps of the method for performing a structural heart repair or replacement procedure shown in FIG. 3.

In another example, as shown in FIG. 5, the method 200 may further include a thirteenth step 226 of planning, using the computer system 106, a predetermined trajectory of insertion of the tracked instrument 104 into the patient to provide a predetermined trajectory dataset 146. Upon completion of the planning, the method 200 may further include a fourteenth step 228 of rendering, by the augmented reality system 102, a trajectory hologram 142 based on the predetermined trajectory dataset 146.

The trajectory hologram 142 of the present disclosure may include a holographic light ray illustrating the predetermined trajectory of the tracked instrument 104, for example. The holographic light ray may be linear or curvilinear, or may have one or more angles, and may depict an optimum path for the tracked instrument 104. The trajectory hologram 142 can also be used to clearly identify the percutaneous entry point on the patient and an intravascular landing point within the patient for the tracked instrument 104, such as a preferred landing zone with the structure of the heart of the patient for the implant to be deployed.

It should be appreciated that the overall size, shape, and orientation of the trajectory hologram 142 generated by the augmented reality system 102 may be based on operating information from the computer system 106 including preoperative data and intraoperative data. It should also be appreciated that the operating information may include additional data from other sensors in the operating arena and also the other holographic projections 134, 136, 138, 140 being generated by the augmented reality system 102.

The preoperative data may include information related to the patient obtained prior to the medical procedure, for example, using the first holographic image acquisition system 108. Nonlimiting examples of preoperative data includes static images or recordings from a transesophageal echocardiogram, a transabdominal echocardiograph, a transthoracic echocardiogram, a computerized tomography (CT) scan, a magnetic resonance imaging (MRI) scan, or an X-ray. It should be appreciated that the preoperative data may include information from other diagnostic medical procedures, as desired.

The intraoperative data may include information related to the patient obtained in real-time during the medical procedure, for example, with the second holographic image acquisition system 110. For example, the diagnostic medical procedures listed hereinabove above that may be performed simultaneously with the current medical procedure.

In further embodiments, the plurality of operating information includes fused preoperative and intraoperative data. The fused preoperative and intraoperative data merges preoperative and intraoperative data in such a way to present more concise and approximated images and animations to the practitioner. In some instances, the fusion is done manually. In other instances, the fusion is done by the computer system 106, for example, using at least one of a plurality of algorithms set forth in the machine-readable instructions 130 or via artificial intelligence (AI).

As described hereinabove, in certain embodiments the holographic light ray may be anchored on the preselected reference point of the tracked instrument 104. In yet further examples, the intended trajectory can also be adjusted via the computer system 106 in real-time by the practitioner, for example, to address any unforeseen complications that may arise during the procedure.

It is believed that the trajectory hologram 142, along with other holographic projections, may minimize a risk of complications associated with transapical approach procedures. For example, an overall size of an incision in the heart, arteries, or veins may be minimized because the practitioner is able to be more precise with the intended trajectory of the tracked instrument 104 via the trajectory hologram 142 such as the holographic light ray.

In addition, it is believed that the trajectory hologram 142 permits the practitioner to more easily find an optimal approach angle for a valve implantation or a paravalvular leak (PVL) closure. Also, enabling the practitioner to more easily find the optimal approach angle helps the practitioner avoid critical structures, such as lung tissue, coronary arteries, and the left anterior descending artery.

For example, a holographic display of a real-time intraoperative scan may be overlaid with a holographic display of preoperative scan. Also, the fused preoperative and intraoperative data may further include a holographic fusion of CT scan images and intraoperative fluoroscopic imaging, thereby modeling heart motion associated with cardiac cycle. In addition, the fused preoperative and intraoperative data may further include overlays that warn the practitioner of sensitive areas in the body of the patient that should not come into contact with the tracked instrument 104. It should be appreciated that different applications of the fused preoperative and intraoperative data may be employed by one skilled in the art, within the scope of this disclosure.

In yet another embodiment, the computer system 106 of the holographic augmented reality visualization and guidance system 100 may be configured to predict a shape of an implant, such as a valve once the implant has been deployed by the tracked instrument 104. The predicted shape of the implant may also be visualized in the form of a hologram further generated by the augmented reality system 102, for example.

In yet a further embodiment, the computer system 106 of the holographic augmented reality visualization and guidance system 100 may be configured to facilitate a co-axial deployment, i.e., a centering of the valve within the endovascular structure, with the tracked instrument 104. The augmented reality system 102 may be employed to generate "error bars" or coloration (e.g., "green" for acceptable, and "red" for unacceptable) to guide the practitioner in the co-axial deployment during the procedure.

In yet additional embodiments, the computer system 106 of the holographic augmented reality visualization and guidance system 100 may be employed to predict a remodeling of the endovascular or heart structure that is expected to result from the deployed position of the implant over time. In particular, the computer system 106 may project or predict how the heart will be removed over time with a particular placement, and thus permit for planning of the placement in a manner that will minimize the remodeling that may occur over time.

In yet other embodiments, the computer system 106 of the holographic augmented reality visualization and guidance system 100 may be used to help with size selection of a prosthesis or implant prior to completion of the procedure. The employment of the holographic augmented reality visualization and guidance system 100 to select appropriate sizing may minimize an opportunity for patient-prosthesis mismatch (PPM), which may otherwise occur when an implanted prosthetic valve is either too small or large for the patient, Advantageously, the holographic augmented reality visualization and guidance system 100 and method 200 for a structural heart repair or replacement allows the practitioner to simultaneously view the operating data and patient within the same field of view via the augmented reality system 102. In addition, the holographic light ray allows the practitioner to easily determine the intended trajectory of the tracked instrument 104.

It should also be appreciated the method 200 may permit the practitioner to customize how much of the critical operating information is shown in the augmented reality system 102. In addition, the practitioner may customize the settings and attributes of the operating information using, for example, the computer system 106. The method 200 further allows the practitioner to perform an instrument insertion at any desired angle and without the need of additional, disposable, physical instrument guides.

It should be further appreciated that the system 100 and the method 200 of the present disclosure are especially well adapted for use with patients that require mechanical aortic and mitral valve prosthesis, or with a reoccurring need for an endocardial ablation procedure.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for performing a structural heart repair or replacement procedure on a patient, the method comprising steps of:
   providing an augmented reality system, a tracked instrument, a first image acquisition system, a second image acquisition system, and a computer system with a processor and a memory, the tracked instrument having a plurality of sensors, the tracked instrument has an elongate body with a tip portion, a top portion, a bottom portion, and a middle portion, including a tip sensor disposed at the tip portion of the tracked instrument, the first image acquisition system configured for acquiring a first holographic image dataset from the patient, the second image acquisition system configured for acquiring a second holographic image dataset from the patient, and the computer system in communication with the augmented reality system, the tracked instrument, and the first image acquisition system, and the second image acquisition system;
   acquiring, by the first image acquisition system, the first holographic image dataset from the patient, the first holographic image dataset being preoperative;
   acquiring, by the second image acquisition system, the second holographic image dataset from the patient, the second holographic image dataset being intraoperative and acquired in real-time during the structural heart repair or replacement procedure;
   tracking, by the computer system, the tracked instrument using the plurality of sensors to provide a tracked instrument dataset;
   registering, by the computer system, the first holographic image dataset, the second holographic image dataset, and the tracked instrument dataset with the patient;
   rendering, by the augmented reality system, a first hologram based on the first holographic image dataset from the patient for viewing by a practitioner;
   rendering, by the augmented reality system, a second hologram based on the second holographic image dataset from the patient for viewing by a practitioner;
   planning, by the computer system, a predetermined trajectory of insertion of the tracked instrument into the patient to provide a predetermined trajectory dataset;
   rendering, by the augmented reality system, a trajectory hologram based on the predetermined trajectory dataset, wherein the trajectory hologram includes a continuous holographic light ray projecting from the tip sensor of the tracked instrument and extending outward along a path in space to depict a predicted future trajectory of the tracked instrument, the continuous holographic light ray visually representing a beam of light emanating from the tip sensor and illustrating alignment and movement of the tracked instrument along the trajectory hologram, wherein the tip sensor is a preselected reference point for the tracked instrument, the preselected reference point is an anchoring point for the continuous holographic light ray;
   selecting, by the computer system, a predetermined portion of the first hologram and the second hologram to be animated;
   combining, by the computer system, the predetermined portion of the first hologram and the second hologram to create a combined hologram be animated;
   processing, by the computer system the combined hologram, to provide an animated hologram dataset relative to the predetermined portion of the first hologram and the second hologram;
   rendering, by the augmented reality system, an animated hologram from the animated hologram dataset for viewing by the practitioner, wherein the animated hologram is in addition to the first hologram and the second hologram; and
   performing, by the practitioner, the structural heart repair or replacement procedure on the patient while viewing the patient, the first hologram and the animated hologram with the augmented reality system, whereby the practitioner employs the augmented reality system for at least one of visualization, guidance, and navigation of the tracked instrument during the structural heart repair or replacement procedure, and wherein the practitioner uses the trajectory hologram to determine an approach angle to avoid lung tissue, coronary arteries, and a left anterior descending artery.

2. The method of claim 1, wherein the step of providing an augmented reality system, a tracked instrument, a first image acquisition system, a second image acquisition system, and a computer system with a processor and a memory includes a step of providing the first image acquisition system including at least one of a magnetic resonance imaging (MRI) apparatus and a computerized tomography (CT) apparatus.

3. The method of claim 1, wherein the step of providing an augmented reality system, a tracked instrument, a first image acquisition system, a second image acquisition system, and a computer system with a processor and a memory includes a step of providing the second image acquisition system including an ultrasound echocardiogram (ECG) imaging apparatus.

4. The method of claim 3, wherein the second holographic image dataset is acquired by a predetermined modality including one of a transthoracic echocardiogram (TTE), a transesophageal echocardiogram (TEE), and an intracardiac echocardiogram (ICE).

5. The method of claim 1, wherein the predetermined portion is associated with one of a heart and a chest of the patient.

6. The method of claim 5, wherein the predetermined portion is associated with the heart of the patient, and the animated hologram depicts a beating rhythm movement of the heart.

7. The method of claim 5, wherein the predetermined portion is associated with the chest of the patient, and the animated hologram depicts a respiration cycle movement of the chest.

8. The method of claim 1, wherein the step of providing an augmented reality system, a tracked instrument, a first image acquisition system, a second image acquisition system, and a computer system with a processor and a memory, the tracked instrument having a plurality of sensors includes a step of providing the plurality of sensors including a top portion sensor disposed at the top portion, a bottom portion sensor disposed at the bottom portion, and a middle portion sensor disposed at the middle portion.

9. The method of claim 1, wherein the tracked instrument is a catheter configured for insertion of a cardiac implant and wherein the step of providing an augmented reality system, a tracked instrument, a first image acquisition system, a second image acquisition system, and a computer system with a processor and a memory includes a step of providing the cardiac implant including a replacement valve.

10. A system for performing a structural heart repair or replacement procedure on a patient, comprising:
   an augmented reality system;
   a tracked instrument having a plurality of sensors, the tracked instrument has an elongate body with a tip portion, a top portion, a bottom portion, and a middle portion, including a tip sensor disposed at the tip portion of the tracked instrument;
   a first image acquisition system configured to acquire a first holographic image dataset from the patient;
   a second image acquisition system configured for acquiring a second holographic image dataset from the patient; and
   a computer system with a processor and a memory, the computer system in communication with the augmented reality system, the tracked instrument, the first image acquisition system, and the second image acquisition system and configured by machine-readable instructions to:
      track the tracked instrument using the plurality of sensors to provide a tracked instrument dataset;
      register the first holographic image dataset and the second holographic image dataset with the patient; and
      plan a predetermined trajectory of insertion of the tracked instrument into the patient to provide a predetermined trajectory dataset,
   wherein the augmented reality system is configured to render:
      a first hologram based on the first holographic image dataset from the patient for viewing by a practitioner;
      a second hologram based on the second holographic image dataset from the patient for viewing by the practitioner;
      a combined hologram based on an animated hologram dataset relative to a predetermined portion of the first hologram and the second hologram to provide the combined hologram for animation and an animated hologram is rendered from the animated hologram dataset for viewing by the practitioner, wherein the animated hologram is in addition to the first hologram and the second hologram; and
      a trajectory hologram based on the predetermined trajectory dataset for viewing by the practitioner rendering, by the augmented reality system, a trajectory hologram based on the predetermined trajectory dataset, wherein the trajectory hologram includes a continuous holographic light ray projecting from the tip sensor of the tracked instrument and extending outward along a path in space to depict a predicted future trajectory of the tracked instrument, the continuous holographic light ray visually representing a beam of light emanating from the tip sensor and illustrating alignment and movement of the tracked instrument along the trajectory hologram, wherein the tip sensor is a preselected reference point for the tracked instrument, the preselected reference point is an anchoring point for the continuous holographic light ray, and
   whereby the practitioner is permitted to perform the structural heart repair or replacement procedure on the patient while viewing the patient, the first hologram, the second hologram, and the animated hologram with the augmented reality system, and to employ the augmented reality system for at least one of visualization, guidance, and navigation of the tracked instrument during the structural heart repair or replacement procedure, and wherein the practitioner uses the trajectory hologram to determine an approach angle to avoid lung tissue, coronary arteries, and a left anterior descending artery.

11. The method of claim 1, further comprising fusing the preoperative first holographic image dataset and the intraoperative second holographic image dataset.

12. The method of claim 11, further comprising providing an overlay using the fused preoperative first holographic image dataset and intraoperative second holographic image dataset to warn the practitioner of sensitive areas in the body of the patient that should not come into contact with the tracked instrument.

13. The method of claim 1, wherein the animated hologram is based on a real-time imaging of the heart, where the animated hologram beats in rhythm with the heart of the patient in real-time.

14. The system of claim 10, wherein the animated hologram is based on a real-time imaging of the heart, where the animated hologram beats in rhythm with the heart of the patient in real-time.

15. The method of claim 1, further comprising rendering by the augmented reality system a plurality of operating information together with the first hologram, the second hologram, and the animated hologram.

16. The system of claim 10, wherein the augmented reality system is configured to render a plurality of operating information together with the first hologram, the second hologram, and the animated hologram.

17. The method of claim 1, wherein the computer system is configured to facilitate a co-axial deployment including centering of a valve within an endovascular structure with the tracked instrument.

18. The method of claim 1, wherein the trajectory hologram is configured to identify a percutaneous entry point on the patient.

19. The method of claim 1, wherein the wherein the trajectory hologram is configured to identify an intravascular landing point within the patient for the tracked instrument.

* * * * *